US005236767A

United States Patent [19]

Torigoe et al.

[11] Patent Number: 5,236,767

[45] Date of Patent: Aug. 17, 1993

[54] THERMAL TRANSFER RECORDING FILM

[75] Inventors: Nobuyuki Torigoe; Kenji Ogi; Koichi Tanaka; Eiichi Akutsu; Toshihiko Shigeeda, all of Kanagawa, Japan

[73] Assignee: Fuji Xerox Co., Ltd., Tokyo, Japan

[21] Appl. No.: 546,312

[22] Filed: Jul. 3, 1990

[30] Foreign Application Priority Data

Jul. 3, 1989 [JP] Japan ................................ 1-169880

[51] Int. Cl.⁵ ................................................ B32B 9/00

[52] U.S. Cl. ................................... 428/195; 428/200; 428/480; 428/484; 428/488.1; 428/488.4; 428/913; 428/914

[58] Field of Search .................. 428/195, 488.4, 488.1, 428/484, 913, 914, 200, 480; 346/135

[56] References Cited

U.S. PATENT DOCUMENTS 4,719,169 1/1988 Platzer et al. ........................ 428/195
4,775,578 10/1988 Hayashi et al. ...................... 428/484
4,833,021 5/1989 Shimura et al. .................. 428/488.4
5,049,903 9/1991 Suzuki et al. ....................... 428/913

OTHER PUBLICATIONS

D L Bateman; Hot Melt Adhesives, 3rd ed.; Noyes Data Corp.; Park Ridge, N.J., 1978; pp. 385-389, 403-405.

*Primary Examiner*—Patrick J. Ryan
*Assistant Examiner*—W. Krynski
*Attorney, Agent, or Firm*—Finnegan, Henderson, Farabow, Garrett & Dunner

[57] ABSTRACT

A thermal transfer recording film is disclosed, comprising a support having thereon an image protective layer containing a binder composed of a resin soluble in an organic solvent incapable of dissolving the support, said resin having a glass transition point or a melting point of not lower than 60° C., and an adhesive layer containing a binder composed mainly of a polyester resin comprising terephthalic acid as a main acid component, said polyester resin having a glass transition point of from 30° C. to 60° C., in this order, at least one of said image protective layer and adhesive layer containing a coloring material. The recording film forms a transferred image having durability and satisfactory image quality on a smooth surface of a material such as glass, as well as paper and resin films, with a low heat energy.

8 Claims, 1 Drawing Sheet

THERMAL TRANSFER RECORDING FILM

FIELD OF THE INVENTION

This invention relates to a thermal transfer recording film for recording an image on a smooth surface, such as a glass surface and a metal surface, by a thermal transfer process in the same manner as can be accomplished on paper or synthetic resin films.

BACKGROUND OF THE INVENTION

Various types of thermal transfer recording films are known for image formation by a thermal transfer process. These thermal transfer recording films are used in a thermal head recording system, a electrical transfer recording system, etc. The most widespread thermal transfer recording films comprise a support having thereon an ink layer containing waxes having a melting point of from 50° to 90° C. or colored resins having a softening point of from 50° to 120° C. so that the ink layer may be adhered at relatively low temperatures and, if desired, a release layer between the support and the ink layer. FIG. 6 schematically illustrates a cross-sectional view of a conventional thermal transfer recording film for use in an electrical transfer recording system. The film of FIG. 6 comprises resistant heating element 11 as a support having provided thereon electrically conductive layer 12, release layer 4, and ink layer 2 in this order.

The conventional thermal transfer recording films have a disadvantage that the ink layer cannot be sufficiently transferred onto such materials that have a smaller specific heat and a higher heat conductivity as compared with paper or resin films, or e.g., a glass plate. The amount of heat applied may be increased for the ink layer to be sufficiently transferred, but which, in turn, requires sufficient heat resistance of the support. It has been attempted to eliminate the above-described disadvatnage by lowering the softening point of the ink layer, but it results in reduction in strength of the ink layer at ambient temperature and also deterioration of stability of the transferred (recorded) image.

SUMMARY OF THE INVENTION

An object of this invention is to provide a thermal transfer recording film which forms a transferred image having durability and satisfactory image quality on a smooth surface of a material such as glass, as well as paper and resin films, with a low thermal energy.

The present invention relates to a thermal transfer recording film comprising a support having thereon an image protective layer containing a binder composed of a resin soluble in an organic solvent incapable of dissolving the support, said resin having a glass transition point (Tg) or a melting point (m.p.) of not lower than 60° C., and an adhesive layer containing a binder composed mainly of a polyester resin comprising terephthalic acid as a main acid component, said polyester resin having a glass transition point of from 30° C. to 60° C., in this order, at least one of said image protective layer and adhesive layer containing a coloring material.

DETAILED DESCRIPTION OF THE INVENTION

The present invention is explained with reference to the accompanying drawings.

Figure 1:
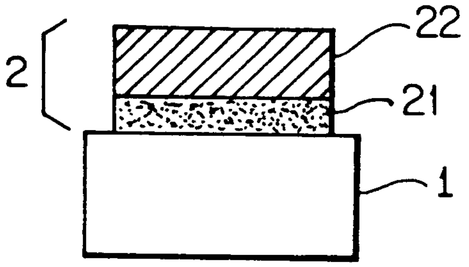
FIG. 1 schematically illustrates a cross-sectional view of a basic structure of the thermal transfer recording film according to the present invention.

In FIG. 1 showing a basic structure of the thermal transfer recording film according to the present invention, support 1 has successively laminated thereon image protective layer 21 and adhesive layer 22 to form ink layer 2.

Figure 2:
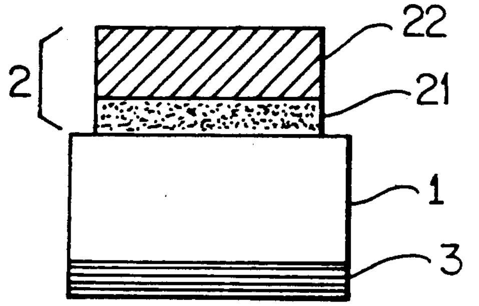
FIG. 2 through 5 each schematically illustrates a cross-sectional view of the thermal transfer recording film obtained in the Examples of the present invention.
Figure 3:
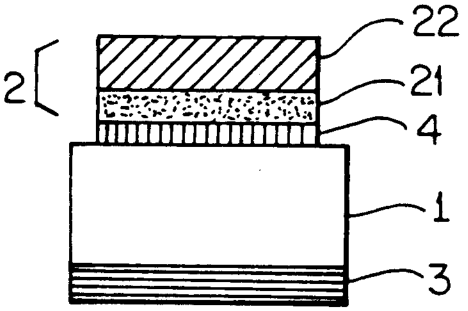
Figure 4:
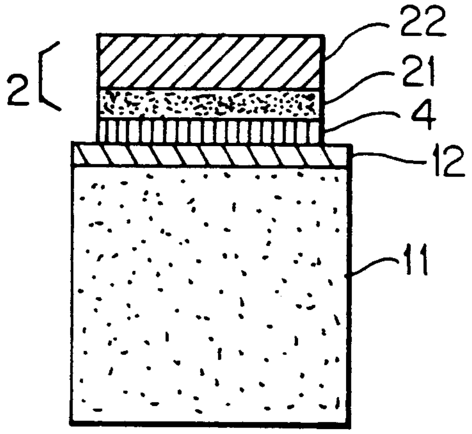
Figure 5:
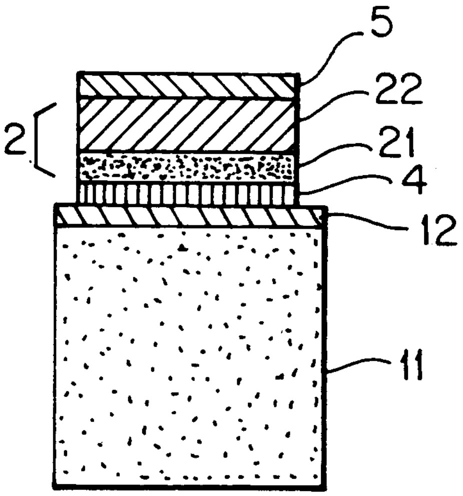
Figure 6:
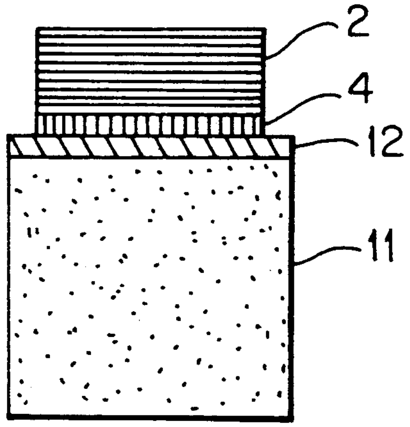
FIG. 6 schematically illustrates a cross-sectional view of a conventional thermal transfer recording film.

FIGS. 2 through 5 show cross-sections of the thermal transfer recording films obtained in the Examples hereinafter described. In FIG. 2, heat resistant layer 3 is provided on the back side of support 1. In FIG. 3, besides heat resistant layer 3, release layer 4 is provided between support 1 and image protective layer 21. According to the embodiments shown in FIGS. 4 and 5, support 1 is composed of resistant heating element 11 with electrically conductive layer 12. In FIG. 4, release layer 4, image protective layer 21, and adhesive layer 22 are provided on conductive layer 12 in this order. In FIG. 5, anti-blocking layer 5 is additionally provided on the surface of adhesive layer 22.

Supports which can be used in the present invention are not particularly limited as long as an ink layer may be supported thereby. Suitable supports include a polyethylene terephthalate film, a polyphenylene sulfide film, a polyimide film, and condenser paper. The support usually has a thickness of from 1 to 50 μm. If desired, a heat resistant layer comprising a heat resistant silicone resin, a heat resistant polyimide resin, a crystalline or amorphous aromatic polyamide resin, etc. may be provided on the support so as to endow the support with heat resistance. The heat resistant layer generally has a thickness of from 0.01 to 5μ.

Where the thermal transfer recording film of the present invention is used in an electrical transfer system, the support should be comprised of a resistant heating element having a conductive layer on one side thereof. The conductive layer functions as an electrode which diffuses and distributes an electrical current having passed through the resistant heating element and preferably has a surface resistivity of not more than 50 Ω/□. Such a conductive layer can be formed by vacuum evaporation, cathode sputtering or any other thin film forming techniques using metals, e.g., aluminum, or alloys. A suitable thickness of the conductive layer ranges from 300 Å to 5 μm. The resistant heating element layer functions to evolve heat by converting a signal current to Joule's heat by which an ink is melted and transferred to a material to be printed. It comprises, for example, a heat resistant resin (e.g., polyimide resins, polyimide-amide resins, silicone resins, fluorine resins, epoxy resins, and polycarbonate resins) having dispersed therein conductive substances, e.g., carbon and metallic powders. A suitable thickness of the resistant heating element layer ranges from 1 to 50 μm.

The release layer which may be provided on the support is to facilitate release of an ink layer formed thereon. The release layer has a lower critical surface tension than that of the ink layer and may be a hard coat film of resin having preferably the critical surface tension of not more than 38 dyne/cm and more preferably 36 dyne/cm or less, for example, a fluorine resin, a polyamide resin, a silicone resin, etc. The release layer usually has a thickness of from 0.1 to 2 μm.

The image protective layer comprises a binder composed of a resin which has a glass transition point or a melting point of not lower than 60° C. and is soluble in an organic solvent incapable of dissolving the support. If desired, the image protective layer also contains a coloring material. The image protective layer serves to protect the surface of a transferred image. To this effect, the constituent resin is selected from those which form a film having a strength sufficient to prevent a transferred image from being damaged under an outer force imposed during usual handling at ambient temperature, have satisfactory adhesion to an adhesive layer hereinafter described, and have a glass transition point or a melting point of not lower than 60° C., preferably from 60° to 100° C., so as not to get tacky in high temperatures. Such resins include polyamide resins, polyvinyl butyral resins, vinyl chloride resins, ethylene-vinyl acetate copolymer resins, styrene resins, acrylic resins, polyester resins, polyurethane resins, polyvinylpyrrolidone, polyvinyl alcohol, cellulose resins, and derivatives thereof. The image protective layer generally contains 50 to 100 wt %, preferably 70 to 100 wt %, of the binder and has a thickness of from 0.1 to 3 μm, and preferably from 0.3 to 1.0 μm.

The adhesive layer forming an ink layer together with the image protective layer chiefly serves as an adhesive. It comprises a binder composed mainly of a polyester resin comprising terephthalic acid as a main acid component, the polyester resin having a glass transition point of from 30° to 60° C. so that it is easily melted with a low heat energy and adheres to a material to be printed. Examples of the polyester resin include polyalkylene terephthalate comprising terephthalic acid as an acid component and a glycol (e.g., ethylene glycol and propylene glycol), ethylene oxide, glycerine etc. as an alcohol component, and block copolymers of these components and a polyalkylene oxide, e.g., poly(tetramethylene oxide)glycol.

The acid component should consist mainly of terephthalic acid i.e., containing at least 50 mol % and preferably 70 to 100 mol % terephthalic acid, so as to form an ink layer having a glass transition point capable of thermal transfer, yet imparting a sufficient strength to the ink layer. If desired, terephthalic acid may be used in combination with a minor proportion of other acid components, e.g., isophthalic acid and p-hydroxybenzoic acid.

The polyester resin is generally contained in an amount of from 50 to 100 wt %, preferably from 70 to 100 wt %, based on the binder of the adhesive layer. The balance of the binder may be thermoplastic resins such as polyvinyl butyral resins, vinyl chloride resins, ethylene-vinyl acetate copolymer resins, styrene resins, acrylic resins, polyurethane resins, cellulose resins, and the like. Other polyesters, e.g., polyethylene sebacate and polyethylene adipate may also be contained in the binder.

The adhesive layer may also contain a coloring material. The thickness of the adhesive layer is from 0.5 to 5 μm, and preferably from 1.0 to 3.0 μm. If it is less than 0.5 μm, adhesion would be insufficient and the transferred image is likely to be cut in places due to unevenness of the surface of a material to be printed. If the thickness exceeds 5 μm, the requisite heat energy increases, and the resolving power of the image is reduced.

A total thickness of the image protective layer and adhesive layer constituting an ink layer is generally in the range of from 1 to 5 μm, and preferably from 1.5 to 4.0 μm.

The coloring material which can be used in the image protective layer and/or the adhesive layer includes dyes and pigments conventionally known for printing inks or other coloring purposes, such as black dyes and pigments, e.g., carbon black, oil black, graphite, etc.; acetoacetic acid arylamide type monoazo yellow pigments (First Yellow type), e.g., C.I. Pigment Yellow 1, 3, 74, 97 or 98, etc.; acetoacetic acid arylamide type disazo yellow pigments, e.g., C.I. Pigment Yellow 12, 13 or 14, etc.; yellow dyes, e.g., C.I. Solvent Yellow 19, 77 or 79, C.I. Disperse Yellow 164, etc.; red or deep red pigments, e.g., C.I. Pigment Red 48, 49:1, 53:1, 57:1, 81, 122 or 5, etc.; red dyes, e.g. C.I. Solvent Red 52, 58 or 8, etc.; blue dyes and pigments, such as copper phthalocyanine or its derivatives or modified compounds, e.g., C.I. Pigment Blue 15:3, etc.; and colored or colorless subliming dyes.

These coloring materials may be used alone or in combination of two or more thereof. It is possible, of course, to mix them with extender pigments or white pigments for controlling color tone. In order to improve the dispersing property of these coloring materials in the binder componet(s), they may be treated with surface active agents, coupling agents, such as silane coupling agents, or polymers, or polymeric dyes or polymeric graft pigments may be employed.

If desired, an anti-blocking layer is provided on the surface of the adhesive layer. The anti-blocking layer prevents the adhesive layer from sticking to the back side of the support where the recording film is stored, for example, in roll form. Such a layer can be formed by using a resin (e.g., polyvinyl butyral), a wax or a mixture thereof having a glass transition point or melting point of not lower than 40° C., and preferably not lower than 60° C. Various dyes or pigments as coloring materials or extender pigments may also be incorporated into the anti-blocking layer. The anti-blocking layer preferably has a thickness of not more than 1.0 μm.

The thermal transfer recording film according to the present invention can be used, for example, in a thermal head recording system or an electrical transfer recording system to form a transferred image on various materials, such as glassware (e.g., glass plate), plastic sheets, metallic products (e.g., metallic plate), wood products, paper, and the like.

The present invention is now illustrated in greater detail with reference to Examples, but it should be understood that the present invention is not deemed to be limited thereto. All the parts, percents and ratios are by weight unless otherwise indicated

EXAMPLE 1

A coating composition for forming a heat resistant layer having the formulation that follows was coated on one side of a 3.5 μm-thick PET film ("Lumilar FC53" produced by Toray Industries, Inc.) with a wire bar to form a 0.4 μm-thick heat resistant layer. On the other side of the film was coated a coating composition for forming an image protective layer having the formulation that follows with a wire bar and dried to form a 0.9 μm-thick image protective layer. Then, a coating composition for forming an adhesive layer having the formulation that follows was coated on the image protective layer with a wire bar and dried to form a 2.1 μm-thick adhesive layer. There was thus produced a thermal transfer recording film having a 3.0 μm-thick ink layer.

| | |
|---|---|
| Coating Composition for Heat Resistant Layer: | |
| Polyimide resin ("Polyimide XU 218" produced by Ciba Geigy) | 0.7 part |
| Carbon black (filler) | 0.3 part |
| Methylene chloride | 99 parts |
| Coating Composition for Image Protective Layer: | |
| Polyvinyl butyral ("Eslec BM-5" produced by Sekisui Chemical Co., Ltd.; Tg: about 63° C.) | 4.495 parts |
| Carbon black | 0.5 part |
| Fluorine-containing surfactant ("Unidyne D5-401" produced by Daikin Kogyo Co., Ltd.) | 0.005 part |
| 2-Propanol | 95 parts |
| Coating Composition for Adhesive Layer: | |
| Aromatic polyester resin (copolymer comprising a terephthalic acid/ethylene oxide reaction product and poly(tetramethylene oxide)glycol; number average molecular weight: 2250; weight average molecular weight: 5600; acid value (mg KOH/g): 0.7; Tg: 30° C.) | 9 parts |
| Carbon black | 1 part |
| Methyl isobutyl ketone | 90 parts |

In preparing the coating compositions, the coloring material or filler was dispersed in a hard glass-made ball mill for 48 hours (hereinafter the same unless otherwise specified).

EXAMPLE 2

A thermal transfer recording film was produced in the same manner as in Example 1, except for using the following coating composition for forming an image protective layer.

| Coating Composition for Image Protective Layer: | |
|---|---|
| Polyamide resin ("DPX-802" produced by Henkel Hakusui; m.p.: about 85° C.) | 4.5 parts |
| Carbon black | 0.5 part |
| Toluene | 25 parts |
| 2-Propanol | 70 parts |

COMPARATIVE EXAMPLE 1

On one side of the same support as used in Example 1, a heat resistant layer was formed in the same manner as in Example 1. The support was placed on a hot plate heated at 110° C., and a coating composition for forming an ink layer having the following formulation was coated on the other side of the support with a wire bar to form a 3.1 μm-thick ink layer.

| Coating Composition for Ink Layer: | |
|---|---|
| Paraffin wax ("Paraffin 155" produced by Nippon Seiro Co., Ltd.; m.p.: 65° C.) | 82 parts |
| Mineral oil (softness-imparting agent) | 3 parts |
| Carbon black | 15 parts |

In preparing the coating composition, the three components were heated and melt-kneaded at 100° C. in a three-roll mill.

COMPARATIVE EXAMPLE 2

On one side of the same support as used in Example 1, a heat resistant layer was formed in the same manner as in Example 1, and a coating composition for forming an ink layer having the following formulation was coated on the other side with a wire bar to form a 2.8 μm-thick ink layer.

| Coating Composition for Ink Layer: | |
|---|---|
| Aromatic polyester resin (comprising a bisphenol A/propylene glycol reaction product and fumaric acid; number average molecular weight: 3600; weight average molecular weight: 11000; acid value (mg KOH/g): 28; Tg: 62° C.) | 8.5 parts |
| Methyl ethyl ketone | 90 parts |
| Carbon black | 1.5 part |

COMPARATIVE EXAMPLE 3

A thermal transfer recording film was produced in the same manner as in Comparative Example 2, except for using the following composition for forming an ink layer.

| Coating Composition for Ink Layer: | |
|---|---|
| Aliphatic polyester resin (comprising adipic acid, 1,4-butanediol, and ethylene glycol; number average molecular weight: 2350; weight average molecular weight: 52000; acid value (mg KOH/g): 0.8; m.p.: 36° C.) | 8.5 parts |
| Methyl ethyl ketone | 60 parts |
| Toluene | 30 parts |
| Carbon black | 1.5 part |

EXAMPLE 3

On one side of the same support as used in Example 1, a heat resistant layer was formed in the same manner as in Example 1. A coating composition for forming a release layer having the formulation that follows was coated on the other side of the support with a wire bar and dried to form a 0.1 μm-thick release layer. A coating composition for forming an image protective layer having the formulation that follows was then coated on the release layer with a wire bar and dried to form a 0.8 μm-thick image protective layer. A coating composition for forming an adhesive layer having the formulation that follows was further coated thereon with a wire bar and dried to form a 1.6 μm-thick adhesive layer. There was thus produced a thermal transfer recording film having a 2.4 μm-thick ink layer.

| | |
|---|---|
| Coating Composition for Release Layer: | |
| Fluorine-containing surface treating agent (10 wt % solution of "Texguard TP-200" produced by Daikin Kogyo Co., Ltd. in 2-propanol) | 5 parts |
| 2-Propanol | 95 parts |
| Coating Composition for Image Protective Layer: | |
| Polyamide resin ("Polymaid S-40E" produced by Sanyo Chemical Industries Co., Ltd.; m.p.: about 110° C.) | 4.5 parts |
| Cyan ink pigment (C.I. Pigment Blue 15:3) | 0.5 part |
| Toluene | 25 parts |
| 2-Propanol | 70 parts |
| Coating Composition for Adhesive Layer: | |
| Aromatic polyester resin (copolymer of a | 9 parts |

-continued

| | |
|---|---|
| terephthalic acid/ethylene oxide reaction product and poly(tetramethylene oxide) glycol; number average molecular weight: 2250; weight average molecular weight: 5600; acid value (mg KOH/g): 0.7; Tg: 30° C.) | |
| Cyan ink pigment (C.I. Pigment Blue 15:3) | 1 part |
| Methyl isobutyl ketone | 90 parts |

COMPARATIVE EXAMPLE 4

On one side of the same support as used in Example 1, a heat resistant layer was formed in the same manner as in Example 1. A coating composition for forming a release layer having the formulation that follows was coated on the other side of the support with a wire bar and dried to form a 0.1 μm-thick release layer. A coating composition for forming an ink layer having the formulation that follows was further coated thereon with a wire bar and dried to form a 2.6 μm-thick ink layer.

| | |
|---|---|
| Coating Composition for Release Layer: | |
| Fluorine-containing surface treating agent (10 wt % solution of "Texguard FS-107" produced by Daikin Kogyo Co., Ltd. in 2-propanol) | 5 parts |
| 2-Propanol | 95 parts |
| Coating Composition for Ink Layer: | |
| Aromatic polyester resin (comprising a bisphenol A/propylene glycol reaction producet and fumaric acid; number average molecular weight: 3600; weight average molecular weight: 11000; acid value (mg KOH/g): 28; Tg: 62° C.) | 8.5 parts |
| Cyan ink pigment (C.I. Pigment Blue 15:3) | 1 part |
| Methyl isobutyl ketone | 90 parts |

EXAMPLE 4

Aluminum was vacuum-evaporated onto a 15 μm-thick carbon black-containing conductive polycarbonate film ("Makrofol KL 3-1009" produced by Bayer A. G.) to prepare a resistant heating element film having a conductive layer having a surface resistivity of 0.6 Ω/square and a thickness of 0.06 μm.

A coating composition for forming a release layer having the following formulation was coated on the conductive layer of the thus prepared support with a wire bar and dried to form a 0.1 μm-thick release layer. A coating composition for forming an image protective layer having the formulation that follows was then coated on the release layer with a reverse-roll coater and dried to form a 1.0 μm-thick image protective layer. A coating composition for forming an adhesive layer having the formulation that follows was further coated thereon with a reverse-roll coater and dried to form a 1.9 μm-thick adhesive layer. There was thus produced a thermally transfer recording film having a 2.9 μm-thick ink layer.

| | |
|---|---|
| Coating Composition for Release Layer: | |
| Fluorine-containing surface treating agent (10 wt % solution of "Texguard TP-200" produced by Daikin Kogyo Co., Ltd. in 2-propanol) | 5 parts |
| 2-Propanol | 95 parts |
| Coating Composition for Image Protective Layer: | |
| Polyamide resin ("Bersamide 744" produced by Henkel Hakusui"; m.p.: about 120° C.) | 4.5 parts |
| Carbon black | 0.5 part |
| Toluene | 25 parts |
| 2-Propanol | 70 parts |
| Coating Composition for Adhesive Layer: | |
| Aromatic polyester resin (copolymer of a terephthalic acid/ethylene oxide reaction product and poly(tetramethylene oxide)glycol; number average molecular weight: 5700; weight average molecular weight: 19500; acid value: (mg KOH/g): 2.8; Tg: 50° C.) | 9 parts |
| Carbon black | 1 part |
| Ethyl acetate | 90 parts |

COMPARATIVE EXAMPLE 5

A coating composition for forming a release layer having the formulation that follows was coated on a conductive layer of the same support as prepared in Example 4 with a wire bar and dried to form a 0.1 μm-thick release layer. Then, a coating composition for forming an ink layer having the following formulation was coated thereon with a reverse-roll coater and dried to form a 2.6 μm-thick ink layer.

| | |
|---|---|
| Coating Composition for Release Layer: | |
| Fluorine-containing surface treating agent (10 wt % solution of "Texguard FS-107" produced by Daikin Kogyo Co., Ltd. in 2-propanol) | 5 parts |
| 2-Propanol | 95 parts |
| Coating Composition for Ink Layer: | |
| Aromatic polyester resin (comprising a bisphenol A/propylene glycol reaction product and fumaric acid; number average molecular weight: 3600; weight average molecular weight: 11000; acid value (mg KOH/g): 28; Tg: 62° C.) | 9 parts |
| Methyl ethyl ketone | 90 parts |
| Carbon black | 1 part |

COMPARATIVE EXAMPLE 6

A thermal transfer recording film was produced in the same manner as in Comparative Example 5, except for using the following coating composition for forming an ink layer.

| Coating Composition for Ink Layer: | |
|---|---|
| Polyamide resin (the resin of Run No. 1 of Example 1 of JP-A-63-45090; m.p.: 86° C.) | 9 parts |
| Toluene | 30 parts |
| 2-Propanol | 70 parts |
| Carbon black | 1 part |

EXAMPLE 5

A coating composition for forming a release layer having the formulation that follows was coated on the conductive layer of the same support as prepared in Example 4 with a wire bar and dried to form a 0.2 μm-thick release layer. Then, a coating composition for forming an image protective layer having the formulation that follows was coated thereon with a reverse-roll coater and dried to form a 0.8 μm-thick image protective layer. A coating composition for forming an adhesive layer having the formulation that follows was further coated on the image protective layer with a reverse-roll coater and dried to form a 2.0 μm-thick adhesive layer. Finally, a coating composition for forming an anti-blocking layer having the formulation that follows was coated on the adhesive layer with a reverse-roll coater and dried to form a 0.5 μm-thick anti-blocking layer. There was thus produced a thermal transfer recording film having a 3.3 μm-thick ink layer.

| | |
|---|---|
| Coating Composition for Release Layer: | |
| Polyamide resin ("Bersamide 940" produced by Henkel Hakusui; m.p.; about 105° C.) | 2 parts |
| m-Xylene | 18 parts |
| 2-Propanol | 80 parts |
| Coating Composition for Image Protective Layer: | |
| Polyvinyl butyral ("Eslec BM-5") | 4.5 parts |
| Cyan ink pigment (C.I. Pigment Blue 15:3) | 0.5 part |
| 2-Propanol | 95 parts |
| Coating Composition for Adhesive Layer: | |
| Aromatic polyester resin (terephthalic acid/ethylene oxide reaction product; number average molecular weight: 1200; weight average molecular weight: 2400; acid value (mg KOH/g): 1.0; Tg: 35° C.) | 9 parts |
| Cyan ink pigment (C.I. Pigment Blue 15:3) | 1 part |
| Methyl isobutyl ketone | 90 parts |
| Coating Composition for Anti-Blocking Layer: | |
| Polyvinyl butyral ("Eslec BL-S" produced by Sekisui Chemical Industries Co., Ltd.) | 5 parts |
| 2-Propanol | 95 parts |

EXAMPLE 6

A thermal transfer recording film was produced in the same manner as in Example 5, except for using the following composition for forming an adhesive layer.

| Coating Composition for Adhesive Layer: | |
|---|---|
| Aromatic polyester resin (terephthalic acid/ethylene oxide reaction product; number average molecular weight: 1490; weight average molecular weight: 2900; acid value (mg KOH/g): 0.7; Tg: 48° C.) | 9 parts |
| Cyan ink pigment (C.I. Pigment Blue 15:3) | 1 part |
| Methyl isobutyl ketone | 90 parts |

EXAMPLE 7

A thermal transfer recording film was produced in the same manner as in Example 5, except for using the following composition for forming an adhesive layer.

| Coating Composition for Adhesive Layer: | |
|---|---|
| Aromatic polyester resin (terephthalic acid/ethylene oxide reaction product; number average molecular weight: 2350; weight average molecular weight: 6200; acid value (mg KOH/g): 1.1; Tg: 56° C.) | 9 parts |
| Cyan ink pigment (C.I. Pigment Blue 15:3) | 1 part |
| Methyl isobutyl ketone | 90 parts |

EXAMPLE 8

The same coating composition for forming a release layer as used in Example 5 was coated on the conductive layer of the same support as prepared in Example 4 with a wire bar and dried to form a 0.1 μm-thick release layer. Then, a coating composition for forming an image protective layer having the formulation that follows was coated thereon with a reverse-roll coater and dried to form a 0.5 μm-thick image protective layer. A coating composition for forming an adhesive layer having the formulation that follows was further coated on the image protective layer with a reverse-roll coater and dried to form a 1.5 μm-thick adhesive layer. Finally, the same coating composition for forming an anti-blocking layer as used in Example 5 was coated on the adhesive layer with a reverse-roll coater and dried to form a 0.5 μm-thick anti-blocking layer. There was thus produced a thermal transfer recording film having a 2.5 μm-thick ink layer.

| | |
|---|---|
| Coating Composition for Image Protective Layer: | |
| Polyvinyl butyral ("Denka Butyral #4000-2" produced by Electrochemical Industry Co., Ltd.; Tg: about 63° C.) | 4.5 parts |
| Cyan ink pigment (C.I. Pigment Blue 15:3) | 1 part |
| 2-Propanol | 95 parts |
| Coating Composition for Adhesive Layer: | |
| Aromatic polyester resin (terephthalic acid/ethylene oxide reaction product; number average molecular weight: 1200; weight average molecular weight: 2400; acid value (mg KOH/g): 1.0; Tg: 35° C.) | 9 parts |
| Cyan ink pigment (C.I. Pigment Blue 15:3) | 1 part |
| Ethyl acetate | 90 parts |

EXAMPLE 9

The same coating composition for forming a release layer as used in Example 5 was coated on the conductive layer of the same support as prepared in Example 4 with a wire bar and dried to form a 0.1 μm-thick release layer. Then, a coating composition for forming an image protective layer having the formulation that follows was coated thereon with a reverse-roll coater and dried to form a 0.4 μm-thick image protective layer. A coating composition for forming an adhesive layer having the formulation that follows was further coated on the image protective layer with a reverse-roll coater and dried to form a 1.6 μm-thick adhesive layer. Finally, a coating composition for forming an anti-blocking layer having the formulation that follows was coated on the adhesive layer with a reverse-roll coater and dried to form a 0.4-μm thick anti-blocking layer. There was thus produced a thermally transfer recording film having a 2.4 μm thick-ink layer.

| | |
|---|---|
| Coating Composition for Image Protective Layer: | |
| Polyvinyl butyral ("Denka Butyral #6000-C" produced by Elecrochemical Industry Co., Ltd.; Tg: about 85° C.) | 4 parts |
| Cyan ink pigment (C.I. Pigment Blue 15:3) | 0.5 part |
| Yellow ink pigment (C.I. Pigment Yellow 12) | 0.5 part |
| Methyl ethyl ketone | 95 parts |
| Coating Composition for Adhesive Layer: | |
| Aromatic polyester resin (copolymer comprising an terephthalic acid/ethylene oxide reaction product and poly(tetramethylene oxide) glycol; number average molecular weight: 2250; weight average molecular weight: 5600; acid value (mg KOH/g): 0.7; Tg: 30° C.) | 9 parts |
| Cyan ink pigment (C.I. Pigment Blue 15:3) | 0.5 part |
| Yellow ink pigment (C.I. Pigment Yellow 12) | 0.5 part |
| m-Xylene | 90 parts |
| Coating Composition for Anti-Blocking Layer: | |
| Polyvinyl butyral ("Denka Butyral #4000-2" produced by Electrochemical Industry Co., Ltd.) | 3 parts |
| Titanium oxide | 2 parts |
| 2-Propanol | 95 parts |

COMPARATIVE EXAMPLE 7

A coating composition for forming a release layer having the formulation that follows was coated on the conductive layer of the same support as prepared in Example 4 with a wire bar and dried to form a 0.1 μm-thick release layer. Then, a coating composition for forming an ink layer having the formulation that follows was coated thereon with a reverse-roll coater and dried to form a 1.6 μm-thick ink layer. Finally, a coating composition for forming an anti-blocking layer having the formulation that follows was coated on the ink layer with a reverse-roll coater and dried to form a 0.4 μm-thick anti-blocking layer. There was thus produced a thermal transfer recording film having a 2.0 μm-thick ink layer.

| | |
|---|---|
| Coating Composition for Release Layer: | |
| Fluorine-containing surface treating agent (10 wt % solution of "Texguard TP-200" produced by Daikin Kogyo Co., Ltd. in 2-propanol) | 5 parts |
| 2-Propanol | 95 parts |
| Coating Composition for Ink Layer: | |
| Aliphatic polyester resin (comprising adipic acid, 1,4-butanediol, and ethylene glycol; number average molecular weight: 2350; weight average molecular weight: 52000; acid value (mg KOH/g): 0.8; Tg: 36° C.) | 9 parts |
| Cyan ink pigment (C.I. Pigment Blue 15:3) | 0.5 part |
| Yellow ink pigment (C.I. Pigment Yellow 12) | 0.5 part |
| m-Xylene | 90 parts |
| Coating Composition for Anti-Blocking Layer: | |
| Polyvinyl butyral ("Denka Butyral #4000-2" produced by Electrochemical Industry Co., Ltd.) | 3 parts |
| Titanium oxide | 2 parts |
| 2-Propanol | 95 parts |

Each of the thermal transfer recording films obtained in Examples 1 to 9 and Comparative Examples 1 to 7 was evaluated in terms of preservability. Further, thermal transfer recording was conducted using each recording film to determine a requisite energy and to evaluate image quality and strength of the transferred image. The test methods are shown below. The results obtained are shown in Tables 1 and 2 below.

1) METHOD OF THERMAL TRANSFER RECORDING

(i) Test Conditions

Printing was carried out on (a) paper (on the wire side of paper for electrostatic copying), (b) an OHP sheet ("Xerox OHP sheet"), or (c) an aluminum foil (for domestic use) by using each of the thermal transfer recording films obtained in Examples 1 to 3 and Comparative Examples 1 to 4 according to a general heat-sensitive transfer recording system by means of a printer equipped with a thick-film type thermal head having a heating element of 8 dots/mm.

Printing was carried out on (a) paper (on the wire side of paper for electrostatic copying), (b) an OHP sheet ("Xerox OHP sheet"), (c) an aluminum foil (for domestic use), (d) an iron plate (thickness: 2.0 mm), (e) a glass plate (thickness: 2.5 mm), or (f) a wood plate (a cedar, thickness: 20 mm) by using each of the thermally transfer recording films obtained in Examples 4 to 9 and Comparative Examples 5 to 7 according to an electrical transfer recording system by means of a printer equipped with a recording electrode (electrode size: 65 μm×65 μm) of 8 dots/mm.

(ii) Determination of Requisite Recording Energy

The energy required for obtaining a transferred image of a size corresponding to a dot of the heating element or recording electrode (i.e., ⅛ mm=125 μm) on an OHP sheet was determined.

(iii) Evaluation of Image Quality

Image quality of a transferred image formed with the requisite recording energy was evaluated in terms of resolving power and color characteristics as follows.

(a) Resolving Power

The degree of blur of Chinese characters of many strokes was evaluated by eye according to the following rating system.

5 . . . Very satisfactory
4 . . . Sufficient for practical use
3 . . . Legible
2 . . . Illegible
1 . . . Unprintable

(b) Color Characteristics (inclusive of covering power)

A solid image was printed on paper, an aluminum foil, and a glass plate, and the transferred image was evaluated by eye in terms of color, turbidity, gloss, etc. and rated "Good", "Medium", or "Poor".

2) EVALUATION OF PRESERVABILITY

Heat stability of the thermally transfer recording film before use was evaluated by determining the highest temperature of a heat roll at which the thermally transfer recording film did not undergo denaturation when placed thereon and allowed to stand for 24 hours.

3) EVALUATION OF RECORDED IMAGE STRENGTH

Rough handling shown below was given to an image recorded with the above-determined requisite recording energy, and any change observed by eye was rated "Good" (no substantial change, sufficient for practical use), "Medium" (legible), or "Poor" (illegible due to image disappearance).

(i) Bending: Paper, an OHP sheet or an aluminum foil having a transferred image thereon was bent ten times by hand.

(ii) Scratching: Ten scratches with a nail were given to the transferred image.

(iii) Rubbing: The transferred image was rubbed with finger tips and a rubber eraser ten times.

(iv) Superposition: Sheets or plates of materials of the same kind each having thereon a transferred image were superposed upon each other for 24 hours.

TABLE 1

| Example No. | Image Quality: Resolving Power P | T | Al | St | Gl | W | Color Characteristics P | Al | Gl | Requisite Recording Energy (μJ/got) | Preservability (°C.) | Average Resolving Power | Remark |
|---|---|---|---|---|---|---|---|---|---|---|---|---|---|
| Ex. 1 | 4 | 4 | 3 | — | — | — | — | — | — | 600 | 30 | 3.67 | |

TABLE 1-continued

| Example No. | Image Quality: Resolving Power P | T | Al | St | Gl | W | Color Characteristics P | Al | Gl | Requisite Recording Energy (μJ/got) | Preserv-ability (°C.) | Average Resolving Power | Remark |
|---|---|---|---|---|---|---|---|---|---|---|---|---|---|
| Ex. 2 | 4 | 4 | 3 | — | — | — | — | — | — | 650 | 30 | 3.67 | |
| Comp. Ex. 1 | 3 | 4 | 2 | — | — | — | — | — | — | 750 | 55 | 3.00 | The image on Al streamed. |
| Comp. Ex. 2 | 4 | 4 | 2 | — | — | — | — | — | — | 900 | 55 | 3.33 | Much energy required. |
| Comp. Ex. 3 | 3 | 3 | 2 | — | — | — | — | — | — | 500 | 35 | 2.67 | The image on Al streamed. |
| Ex. 3 | 4 | 4 | 3 | — | — | — | Med. | Good | — | 600 | 30 | 3.67 | |
| Comp. Ex. 4 | 3 | 4 | 2 | — | — | — | Good | Good | — | 850 | 55 | 3.00 | Much energy required. |
| Ex. 4 | 4 | 4 | 3 | 2 | 2 | 3 | — | — | — | 250 | 50 | 3.00 | |
| Comp. Ex. 5 | 3 | 4 | 3 | 1 | 1 | 2 | — | — | — | 300 | 55 | 2.33 | Unrecorded on St and Gl. |
| Comp. Ex. 6 | 3 | 4 | 3 | 1 | 1 | 3 | — | — | — | 300 | 70 | 2.50 | Unrecorded on St and Gl. |
| Ex. 5 | 4 | 4 | 4 | 4 | 4 | 4 | Good | Good | Good | 200 | 55 | 4.00 | |
| Ex. 6 | 4 | 4 | 4 | 3 | 3 | 4 | Good | Good | Good | 250 | 55 | 3.67 | |
| Ex. 7 | 3 | 4 | 4 | 3 | 3 | 3 | Good | Good | Good | 250 | 60 | 3.33 | |
| Ex. 8 | 5 | 5 | 5 | 4 | 4 | 4 | Good | Good | Good | 200 | 55 | 4.50 | |
| Ex. 9 | 5 | 5 | 5 | 4 | 5 | 4 | Good | Good | Good | 200 | 65 | 4.67 | |
| Comp. Ex. 7 | 4 | 3 | 3 | 2 | 2 | 3 | Med. | Poor | Poor | 200 | 65 | 2.83 | The images on St and Gl streamed. |

Note:
P: Paper
T: OHP sheet
Al: Aluminum foil
St: Steel plate
Gl: Glass plate
W: Wood plate

TABLE 2

| Example No. | Strength of Recorded Image: Bending P | T | Al | Scratching P | T | Al | St | Gl | W | Rubbing P | T | Al | St | Gl | W |
|---|---|---|---|---|---|---|---|---|---|---|---|---|---|---|---|
| Ex. 4 | Med. | Good | Med. | Good | Good | Good | Med. | Med. | Good | Good | Good | Good | Good | Med. | Good |
| Comp. Ex. 5 | " | " | " | " | " | " | — | — | " | " | " | " | — | — | " |
| Comp. Ex. 6 | Good | " | Good | Med. | Poor | Poor | — | — | Med. | Med. | Poor | Poor | — | — | Med. |
| Ex. 5 | " | " | " | Good | Good | Good | Good | Med. | Good | Good | Good | Good | Good | Med. | Good |
| Ex. 6 | " | " | " | " | " | " | " | " | " | " | " | " | " | " | " |
| Ex. 7 | Med. | " | " | " | " | " | " | " | " | " | " | " | " | " | " |
| Ex. 8 | Good | " | " | " | " | " | " | Good | " | " | " | " | " | " | " |
| Ex. 9 | " | " | " | " | " | " | " | " | " | " | " | " | " | " | " |
| Comp. Ex. 7 | " | " | " | Med. | Poor | Poor | Poor | Poor | Med. | Med. | Poor | Poor | Poor | Poor | Med. |

| Example No. | Strength of Recorded Image: Superposition P | T | Al | St | Gl | W | Overall Evaluation* |
|---|---|---|---|---|---|---|---|
| Ex. 4 | Good | Med. | Med. | Med. | poor | Good | 0.52 |
| Comp. Ex. 5 | " | " | " | — | — | " | |
| Comp. Ex. 6 | " | " | " | — | — | " | |
| Ex. 5 | " | Good | Good | Good | Good | " | 0.90 |
| Ex. 6 | " | " | " | " | " | " | 0.90 |
| Ex. 7 | " | " | " | " | " | " | 0.86 |
| Ex. 8 | " | " | " | " | " | " | 0.95 |
| Ex. 9 | " | " | " | " | " | " | 0.9 |
| Comp. Ex. 7 | Med. | Med. | Med. | Med. | Med. | Med. | −0.23 |

Note:
Symbols for materials are the same as in Table 1.
*The ratings "Good", "Medium", and "Poor" were taken as 1, 0 and −1, respectively, and an average was calculated to obtain overall evaluation.

The thermal transfer recording films according to the present invention provide a durable and high quality transferred image on a surface of glass, metals, plastics, paper or any other materials having a smooth surface with a low heat energy. Hence, the thermal transfer recording films of the invention can be suitably used in a general thermal transfer recording system using a thermal head or an electrical transfer recording system using a recording electrode for application of signal current.

While the invention has been described in detail and with reference to specific embodiments thereof, it will be apparent to one skilled in the art that various changes and modifications can be made therein without departing from the spirit and scope thereof.

We claim:

1. A thermal transfer recording film comprising a support having thereon an image protective layer containing from 50 to 100% by weight of a binder composed of a polyvinyl butyral resin soluble in an organic solvent incapable of dissolving the support, said resin having a glass transition point or a melting point of not lower than 60° C. and an adhesive layer containing a binder composed mainly of a polyester resin comprising terephthalic acid as a main acid component, said terephthalic acid being present in an amount from 50 to 100 mole percent of said acid component, said polyester resin having a glass transition point of from 30° C. to 60° C., said polyester resin being from 50 to 100 weight percent of said binder in said adhesive layer, in this order, at least one of said image protective layer and adhesive layer containing a coloring material.

2. A thermal transfer recording film as claimed in claim 1, wherein said film further comprises a release layer between the support and the image protective layer, said release layer having a surface tension of not more than 38 dyne/cm, and an anti-blocking layer on the surface of the adhesive layer, said anti-blocking layer having a glass transition point or melting point of from 60° C. to not lower than 40°0 C.

3. A thermal transfer recording film as claimed in claim 1, wherein said film further comprises an anti-blocking layer on the surface of the adhesive layer and having a glass transition point or melting point from 60° C. to not lower than 40° C.

4. A thermal transfer recording film as claimed in claim 1, wherein said support is a resistant heating element having an electrically conductive layer said conductive layer being from 300 Å to 5 μm and a resistivity of not more than 50Ω/square.

5. A thermal transfer recording film as claimed in claim 1, wherein said image protective layer has a thickness of from 0.1 to 3 μm.

6. A thermally transfer recording film as claimed in claim 1, wherein said adhesive layer has a thickness of from 0.5 to 5 μm.

7. A thermally transfer recording film as claimed in claim 1, wherein the binder in said adhesive layer contains 70 to 100 wt % of said polyester resin.

8. A thermally transfer recording film as claimed in claim 1, wherein the acid component of said polyester resin contains 70 to 100 mol % terephthalic acid.

* * * * *

UNITED STATES PATENT AND TRADEMARK OFFICE

CERTIFICATE OF CORRECTION

PATENT NO. : 5,236,767

DATED : August 17, 1993

INVENTOR(S) : Nobuyuki Torigoe et al.

It is certified that error appears in the above-indentified patent and that said Letters Patent is hereby corrected as shown below:

Claim 1, column 16, line 2, after "40°" delete --0--.

Claim 7, column 16, line 19, change "thermally" to --thermal--.

Claim 8, column 16, line 22, change "thermally" to --thermal--.

Signed and Sealed this

Twenty-eighth Day of June, 1994

Attest:

BRUCE LEHMAN

*Attesting Officer*

*Commissioner of Patents and Trademarks*